United States Patent [19]
Graf et al.

[11] Patent Number: 5,876,042
[45] Date of Patent: Mar. 2, 1999

[54] PIPE SEAL WITH A SHEET-METAL CASING BENDABLE AROUND A PIPE

[75] Inventors: Robert Graf, Altenstadt-Filzingen; Dieter Annemaier, Illerkirchber, both of Germany

[73] Assignee: Gruenau Illertissen GmbH, Illertissen, Germany

[21] Appl. No.: 963,509

[22] PCT Filed: Jul. 23, 1994

[86] PCT No.: PCT/EP94/02440

§ 371 Date: Feb. 28, 1996

§ 102(e) Date: Feb. 28, 1996

[87] PCT Pub. No.: WO95/03852

PCT Pub. Date: Feb. 9, 1995

Related U.S. Application Data

[63] Continuation of Ser. No. 591,456, Feb. 28, 1996, abandoned.

[30] Foreign Application Priority Data

Jul. 31, 1993 [DE] Germany .......................... 43 25 757.7

[51] Int. Cl.⁶ ...................................................... F16J 15/00
[52] U.S. Cl. .......................... 277/627; 277/602; 277/931; 277/936; 52/232
[58] Field of Search ................................ 52/232; 277/627, 277/602, 605, 906, 929, 931, 936

[56] References Cited

U.S. PATENT DOCUMENTS

| | | | |
|---|---|---|---|
| 4,850,385 | 7/1989 | Harbeke | 52/232 |
| 4,901,488 | 2/1990 | Murota et al. | 52/232 |
| 4,951,442 | 8/1990 | Harbeke, Jr. | 52/232 |
| 5,103,609 | 4/1992 | Thoreson et al. | 52/232 |

FOREIGN PATENT DOCUMENTS

| | | |
|---|---|---|
| 0486299 | 5/1992 | European Pat. Off. . |
| 9014517 | 1/1991 | Germany . |
| 3930722 | 3/1991 | Germany . |
| 2216220 | 10/1989 | United Kingdom . |

*Primary Examiner*—Daniel G. DePumpo
*Attorney, Agent, or Firm*—Ernest G. Szoke; Wayne C. Jaeschke; Kenneth Watov

[57] ABSTRACT

A device for sealing the gap or void between the outer circumference of a pipe and a hole in a wall the pipe passes through includes a sheet metal casing flexible enough to be bent around the pipe. The inside wall of the casing includes spaced apart inner directed radial projections for containing a swelling agent that is heat activated for filling the void between the housing and pipe in a manner overlapping the gap between the pipe and the wall.

20 Claims, 2 Drawing Sheets

PIPE SEAL WITH A SHEET-METAL CASING BENDABLE AROUND A PIPE

This application is a continuation of application Ser. No. 08/591,456 filed on Feb. 28, 1996 now abandoned, which is a 371 of PCT/EP94/02940, filed on Jul. 23, 1994.

BACKGROUND

1.0. Field of the Invention

This invention relates generally to pipe sealing devices, and more particularly to such devices including heat activated sealing mechanisms for sealing the gap between a pipe and its passage through a wall.

2.0 Discussion of Related Art

A pipe seal of the type in question is used to protect openings or channels in walls or ceilings where pipes pass through. The pipes are generally made of thermoplastics, more particularly polyvinyl chloride, polyethylene and polypropylene, and are generally circular in cross-section, pipes with external diameters of 32 to 400 mm mainly being used in the construction industry.

A pipe seal with very good fire-proof properties is described in applicants' DE 39 30 722 A1. However, it is inconvenient for some applications and entails preassembly of its components in accordance with the particular pipe diameter.

EP 0 486 299 A1 describes a bendable sheet-metal sleeve or a sheet-metal casing provided on its inside with a layer of mouldable swelling compound. In addition, a strip of plastic swelling compound may be associated with this layer to ensure that the metal casing with the swelling compound fits tightly around the pipe.

In a known modification of this construction, the inside of the metal casing is coated solely with a viscous paste of swelling compound.

Finally, it is known that pipes or cables in wall channels can be wrapped in endless tapes of narrow strips of solid swelling compound based on waterglass which are welded between two films and which can be wrapped around the pipes or cables to be protected in one or more laps. The laps are held together by the brickwork surrounding them.

SUMMARY OF THE INVENTION

The problem addressed by the invention is to provide a pipe seal that is simple and inexpensive to make, easy to assemble and, at the same time, quick and effective in reacting to heat.

The invention is characterized in that projections containing swelling compound are associated at intervals from one another about the inside face of the sheet-metal casing. The intervals separating the projections containing swelling compound from one another are advantageous in several respects. They facilitate assembly and provide for rapid and substantially uniform heating of the swelling compound in the event of fire so that it is able to expand rapidly, compressing the pipe and sealing the opening formed. In addition, swelling compound can be saved. Good swelling compounds, which are preferably used, have an expansion capacity of 1:10 or more. By contrast, in known pipe seals with the space-filling quantities of swelling compound, considerably more swelling compound than necessary is used.

The projections on the inside of the sheet-metal casing are best present in only one position and preferably have the same radial height. They may advantageously be in the form of radial spacers between the sheet-metal casing and the pipe. After assembly, therefore, they are in mechanical and thermal contact with the tube they enclose. The projections are preferably permanently connected to the sheet-metal casing which provides for easy assembly. The intervals between the projections are best large enough to enable the sheet-metal casing even to be bent around pipes with a small external diameter without the projections interfering with one another.

In one preferred embodiment, the projections are provided on a holding substrate for the projections of swelling compound, more particularly on a film, from the bottom surface from which they project preferably on one side. The use of a film provides for simple production and alignment of the projections of swelling compound with fixed intervals inbetween. Instead of a film, open holding substrates, such as nets or gauzes, may be provided for the alignment of the projections, particularly where they consist of large pieces of swelling compound. In one particularly preferred embodiment, the bottom surface of the film is in contact with and preferably joined to the inside wall of the sheet-metal casing.

In this way, the sheet-metal casing with the film holding the projections is easy to bend. The connection between the casing and the film, preferably in the form of an adhesive bond, creates a permanent unit of the sheet-metal casing and the projections are filled with swelling compound. The pipe seal does not have to be specially adapted in its construction to certain pipe diameters. One and the same construction can be used both for small and for large pipe diameters. Only the length of the sheet-metal casing with the corresponding projections need be adapted to the outer circumference of the pipe. The sheet-metal casing is preferably in strip form, i.e. its length in the peripheral direction is generally greater than its width in the axial direction of the pipe.

In one particularly advantageous embodiment, the projections are formed with axial ribs. In this way, the metal casing of the pipe seal according to the invention largely assumes the appearance of a cartridge belt. The height-to-width ratio of the projections or ribs can vary. The height, i.e. the radial extent, of the projections is generally the same order as their width in a preferred embodiment. In a preferred embodiment, the height of the projections is even greater than their width, but is generally no more than 1.5 times their width. Before the casing is bent around the pipe, the interval separating the projections from one another in the peripheral direction of the casing is on average of the same order as the width and/or height of the projections and is also influenced by the cross-sectional shape of the projections. Intervals such as these are generally sufficient to allow abundant room for adaptation to various pipe diameters.

In one preferred embodiment of the invention, the swelling compound is largely in contact with the sheet-metal casing. By virtue of the high thermal conductivity of the casing, this contact provides for the uniform transfer of heat to the swelling compound. The projections can be formed by bulges in the film filled with swelling compound. These bulges may be pockets filled with swelling compound. The swelling compound may be present in varying consistency in these pockets, although it is preferably solid. The swelling compound may be in the form of a powder or granules, particularly when the bulges are closed on all sides which can be accomplished by application of a cover film, but especially by bonding to the sheet-metal casing.

The film is preferably a thermoforming film, the bulges being formed by thermoforming. The film preferably consists of a halogen-free, thermoformable material, more particularly polystyrene. The thickness of the film is typically between 0.5 and 1 mm and, if desired, may even be greater. The film can advantageously be bent around the pipe without difficulty, but is otherwise substantially stiff or dimensionally stable.

In one preferred embodiment of the invention, the swelling compound is in the form of one-piece mouldings which preferably completely fill the bulges in the film. In this embodiment of the invention, the bulges in the film do not have to be covered on the open side. The bulges are formed with particular advantage by thermoforming the film around the pieces of swelling compound. In this way, the film closely surrounds and holds the pieces of swelling compound. The pieces of swelling compound advantageously have an uneven surface and/or undercuts. The film is advantageously drawn at least partly into the depressions thus formed so that the pieces of swelling compound are firmly mechanically anchored in the bulges. In addition, the pieces of swelling compound typically have a substantially flat bottom surface. This can advantageously lie in the bottom surface of the film. The projections and preferably the pieces of swelling compound may be substantially rectangular in cross-section. In certain embodiments, they may even be triangular or trapezoidal in cross-section, in which case they advantageously taper towards the pipe. The absolute size of the projections can vary. Projections with a height of 1.5 to 2 cm and a width of 1 to 1.5 cm have been successful. The radial length of the projections depends on whether they are rib-shaped or axially interrupted or offset. The overall axial width of the sheet-metal casing is generally between about 7 and 10 cm. With a width of this order, the pipe seal can be universally used for various pipe diameters. With particularly small pipe diameters, the width of the sheet-metal casing can also be correspondingly reduced. Similarly, it can be increased to accommodate particularly large pipe diameters.

The swelling compound is advantageously weather- and water-resistant. Particularly suitable swelling compounds consist of mixtures based on expanded graphite of the type described in DE 39 30 722 A1. The composition of the swelling compound preferably includes at least one heat-activated swelling compound resistant to high temperatures, more particularly expanded graphite, optionally in combination with at least one swelling compound which responds at low temperatures, and a binder mixture of heat-activated binders which respond at different temperatures.

A preferred composition for the swelling compound contains 5 to 40% by weight, and more particularly 20 to 30% by weight of at least one swelling compound responding at relatively high temperatures, 0 to 30% by weight and more particularly 10 to 25% by weight of at least one swelling compound responding at relatively low temperatures, 30 to 90% by weight and more particularly 50 to 70% by weight of a binder mixture responding at graduated temperatures and 0 to 2% by weight of a hydrophobicizing additive, more particularly hydrophobic silica.

The swelling compound resistant to high temperatures may contain vermiculite and/or perlite instead of expanded graphite. However, expanded graphite is preferably the sole constituent. The swelling compound responding at low temperatures is mainly intended to cause the mixture of swelling compounds to expand if desired in the event of smouldering fires which generally occur at moderately high temperatures. A suitable swelling mixture responding at low temperatures may contain phosphates, organic nitrogen compounds and carbohydrates, as known per se.

A suitable binder mixture contains approximately 10 to 50% by weight of organic binder, approximately 2 to 20% by weight of hotmelt adhesive activated by medium temperatures and approximately 20 to 45% by weight of hotmelt adhesive activated by high temperatures, more particularly glass. The swelling pressure of the swelling mixture may be, for example, 1.4 bar.

The swelling mixture is advantageously bonded by a thermoset, more particularly an epoxy resin. Relatively large sheets can be formed from the swelling mixture and then cut to the corresponding size of the pieces of swelling compound. It is also possible to introduce a mouldable and setting swelling mixture into corresponding moulds and to allow it to set therein. Thus, means for holding the swelling compound may be provided in the form of films with depressions or cups, such as the known compartment films and inlays for holding candies in boxes of candies. Films such as these can be formed by thermoforming or by rolling with perforated/studded rollers into corresponding moulds and may even be very thin-walled and flexible. The depressions may be filled with swelling compound in liquid, paste-like or fine-particle form, after which the swelling compound is preferably solidified, for example by setting of a thermoset resin. Forming by extrusion is also possible.

Both the sheet-metal casing and the film with its projections filled with swelling compound may be produced in endless form and joined to one another. The casing may thus be cut to length to accommodate standard pipe diameters. After being bent around the pipe, the sheet-metal casing may be held together by a clamp strap. Outwardly projecting chamfers may be provided at the ends of the sheet-metal casing and may be screwed or otherwise joined together. In addition, tabs projecting radially outwards which are provided with fastening holes are advantageously bent from one longitudinal edge of the sheet-metal casing which comes into contact with a wall or ceiling. Tooth-like tabs directed radially inwards may be bent from the free longitudinal edge of the sheet-metal casing, optionally forming an additional mechanical anchor for the projections filled with swelling compound and enclosing them between the sheet-metal casing and the pipe in the assembled position. In addition, a gasket may be associated with the pipe seal, more particularly on that side facing a wall or ceiling. This gasket may be made of a non-inflammable material, more particularly a flame-retardant foam. The gasket seals the opening in the wall, particularly in cases where the pipe does not fit tightly therein.

Other features of the invention will become apparent from the following description of preferred embodiments in conjunction with the claims. The individual features may appear either individually or in combination with one another in a given embodiment.

BRIEF DESCRIPTION OF THE DRAWINGS

Various embodiments of the invention are described and illustrated with reference to the following drawings, in which like items are identified by the same reference designation, wherein.

DETAILED DESCRIPTION OF THE INVENTION

Figure 1:
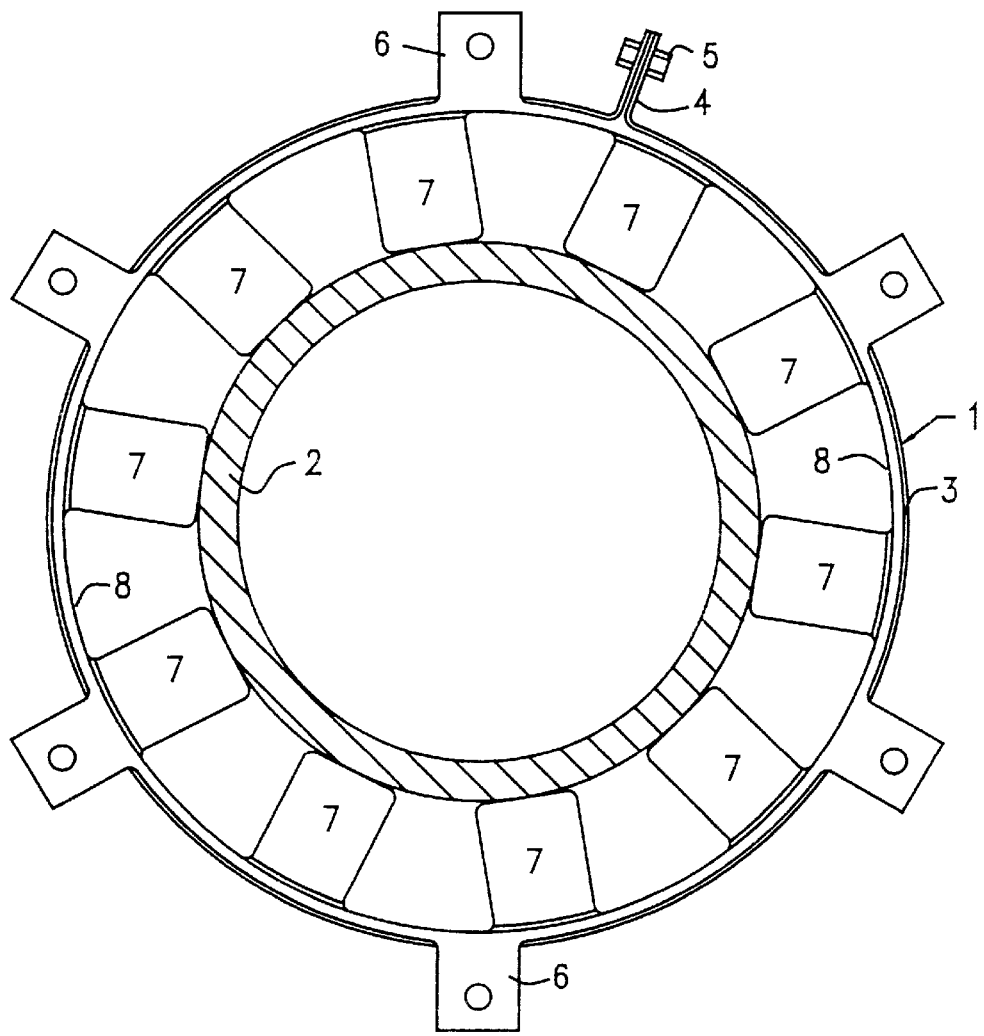
FIG. 1 shows a preferred embodiment of the invention.

The embodiment of the invention illustrated in FIG. 1 shows a pipe seal 1 on a plastic pipe 2, the side facing a wall formed with an opening being visible. The pipe seal 1 comprises a metal casing 3 of flexible sheet metal. The sheet-metal casing is circularly bent and consists of a sheet-metal strip of which the narrow sides comprise tabs 4 bent outwards at a right angle which adjoin one another and which are joined together by screwthreaded fastenings 5. Holed fastening tabs 6 are bent from the longitudinal sides of the sheet-metal casing 3 on that side of the pipe seal 1 facing the wall opening, their function being to fix the pipe seal 1 to a wall or ceiling. Projections 7 of rectangular cross-section serving as spacers project radially from the inside of the sheet-metal casing 3 to the pipe 2, the radial extent of the projections 7 being about 1.25 times their width. The projections 7 have an outer shell of a film 8 and are filled internally with cylindrical or elongated rectangular pieces 9 (see FIGS. 3 and 4) of solid swelling compound. The film 8 is formed by a strip of film which is in contact with and bonded to the inside of the sheet-metal casing 3. In the vicinity of the projections 7, the film 8 has pocket-like bulges surrounding the pieces 9 of swelling compound. The interval separating the projections 7 substantially corresponds to the width of the projections 7 on the inside of the sheet-metal casing 3. In the vicinity of the pipe 2, the intervals are narrower, i.e. only about half as wide. Since the pockets formed in the film in the region of the projections 7 are open on that side facing the inside of the sheet-metal casing 3, the pieces 9 of swelling compound are largely in contact with the sheet-metal casing 3.

It can be seen from FIG. 1 that the projections 7 filled with swelling compound are open at their longitudinal sides. In the event of fire, therefore, they are rapidly heated by hot gases and are thus able to develop their swelling effect. Through the intense swelling of the swelling compound, the gaps between the projections 7 are closed. The swelling compound compresses the plastic pipe 2 as it softens under the effect of heat and thus seals the opening in the wall.

Figure 6:
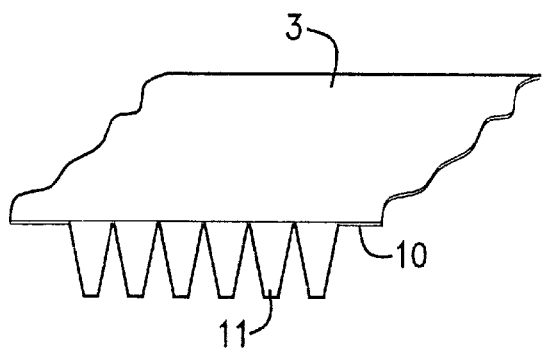
FIG. 6 shows part of the sheet-metal casing with tooth-like holding means.

It can be seen from FIG. 6, which shows a sheet-metal casing 3 before bending, that the longitudinal edge 10 of the sheet-metal casing 3 remote from the wall may be provided with teeth 11 which, after bending, project radially towards the pipe. The teeth 11 form a mechanical anchor for the projections 7 in the space between the sheet-metal casing 3 and the pipe 2, even when the film 8 is not bonded to the casing or if any bond established has separated with time.

Figure 3:
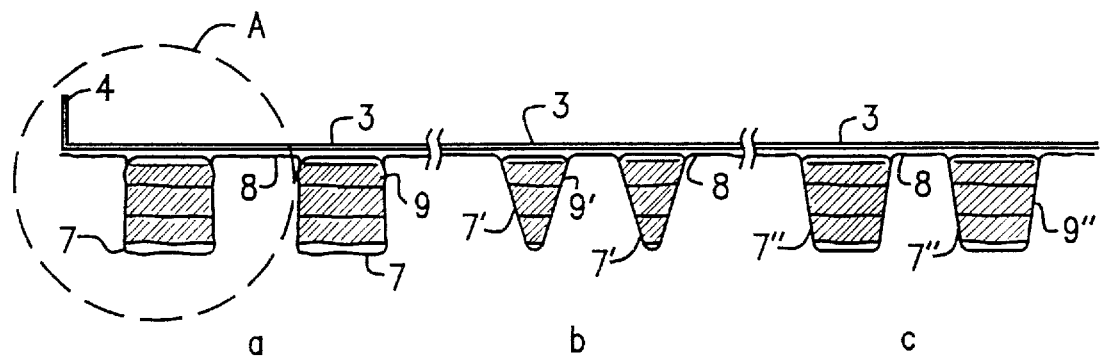
FIG. 3 is a section on the line III—III in FIG. 2.
Figure 2:
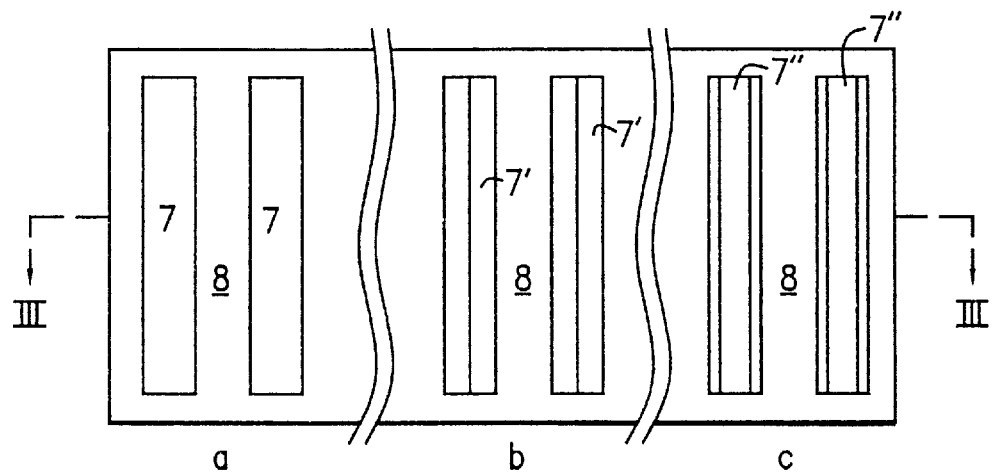
FIG. 2 schematically illustrates various embodiments of an individual sheet-metal casing comprising projections filled with swelling compound for an embodiment of the invention.

FIGS. 2 and 3 are divided up into parts a), b) and c) and show the film bonded to the casing 3 before bending around the pipe. Various cross-sectional forms of the projections 7 or bulges and pieces 9 of swelling compound are shown. Part a) of the Figs. shows a rectangular cross-section of the pieces 9 of swelling compound and the projections 7 in the film 8. Part b) shows triangular cross-sections of the pieces 9' of swelling compound and the bulges 7' while part c) shows trapezoidal cross-sections of the pieces 9" of swelling compound and the bulges 7" of the film 8.

Figure 4:
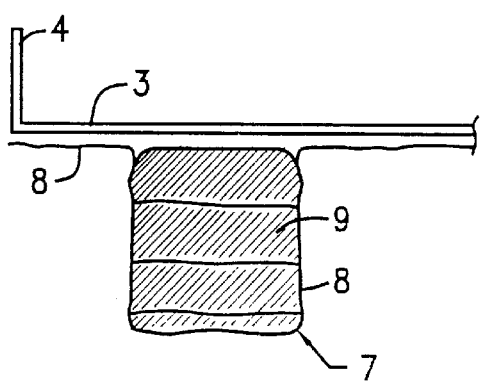
FIG. 4 shows detail A of FIG. 3.

FIG. 4 shows part a) of FIG. 3 on a larger scale. It can be seen that the pieces 9 of swelling compound have an uneven surface. The film 8 is thermoformed around the pieces 9 of swelling compound and thus clings to the surface thereof. In this way, the pieces 9 of swelling compound are mechanically anchored in the bulges or projections 7 formed in the film 8.

Figure 5:
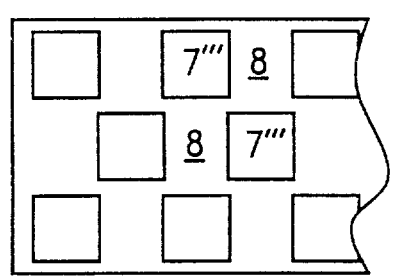
FIG. 5 shows another embodiment of the invention with offset projections.

FIG. 5 shows another alternative for the shape of the projections 7'''. The projections 7''' are substantially cubic in shape and are arranged in three adjacent rows axially of the casing, the rows being offset from one another in such a way that the projections 7''' of the following row are staggered. In this embodiment, the projections 7''' have a larger surface compared with a rib-like shape so that the swelling compound develops its effect even more quickly in the event of fire. In this case, too, the projections may be triangular or trapezoidal in cross-section similarly to the illustration in FIG. 3. Cylindrical projections (knobs) of round cross-section suitably filled with swelling compound may also be provided.

What is claimed is:

1. A pipe seal comprising:
    a flexible sheet metal casing that is bendable around a pipe;
    a strip of film consisting of thermoforming material permanently bonded to one side of said sheet metal casing;
    projections in said film in the form of bulges having intervals interconnected by said film between them such that they can be bent around pipes of different diameters; and
    swelling material in said projections.
2. A pipe seal as claimed in claim 1, wherein the projections are in the form of radial spacers to be between the sheet-metal casing and the pipe with which it is used.
3. A pipe seal as claimed in claim 1, wherein the projections are in contact with the sheet-metal casing.
4. A pipe seal as claimed in claim 1, wherein the intervals between the projections before bending of the sheet-metal casing are large enough to enable the sheet-metal casing to be bent around pipes with a small external diameter without the projections interfering with one another.
5. A pipe seal as claimed in claim 1, wherein the projections are provided on said film from the bottom surface of which they project on one side.
6. A pipe seal as claimed in claim 5, wherein the film can be bent around the pipe, together with the sheet-metal casing, but is otherwise substantially stiff.
7. A pipe seal as claimed in claim 5, wherein the projections are in the form of axial ribs.
8. A pipe seal as claimed in claim 1, wherein the height of projections is greater than their width.
9. A pipe seal as claimed in claim 1, wherein the interval separating the projections from one another in the peripheral direction of the sheet-metal casing before it is bent the same as the width and height of the projections.
10. A pipe seal as claimed in claim 1, wherein the swelling compound is substantially in contact with the sheet-metal casing.
11. A pipe seal as claimed in claim 1, wherein the bulges are formed by thermoforming.
12. A pipe seal as claimed in claim 11, wherein the swelling compound is formed by one-piece moldings which completely fill the bulges in the film.
13. A pipe seal as claimed in claim 12, wherein the film is formed by thermoforming around the pieces of swelling compound.
14. A pipe seal as claimed in claim 12, wherein the pieces of swelling compound have an uneven surface into which the film is at least partly drawn.
15. A pipe seal as claimed in claim 12, wherein the pieces of swelling compound have a substantially flat bottom surface and a cross-section consisting of one of a rectangular, one of triangular, and trapezoidal shape.

16. A pipe seal as claimed in claim 1, wherein the swelling compound is weather- and water-resistant.

17. A pipe seal as claimed in claim 1, wherein the swelling compound is a mixture based on expanded graphite.

18. A pipe seal as claimed in claim 1, wherein the sheet-metal casing and the film formed with the bulges are made in the form of an endless strip and are cut to the required length.

19. A pipe seal as claimed in claim 1, wherein said film of thermoformable material consists of polystyrene.

20. A pipe seal as claimed in claim 1, wherein the thickness of said film ranges between 0.5 mm and 1.0 mm.

* * * * *